United States Patent Office 3,280,469
Patented Oct. 25, 1966

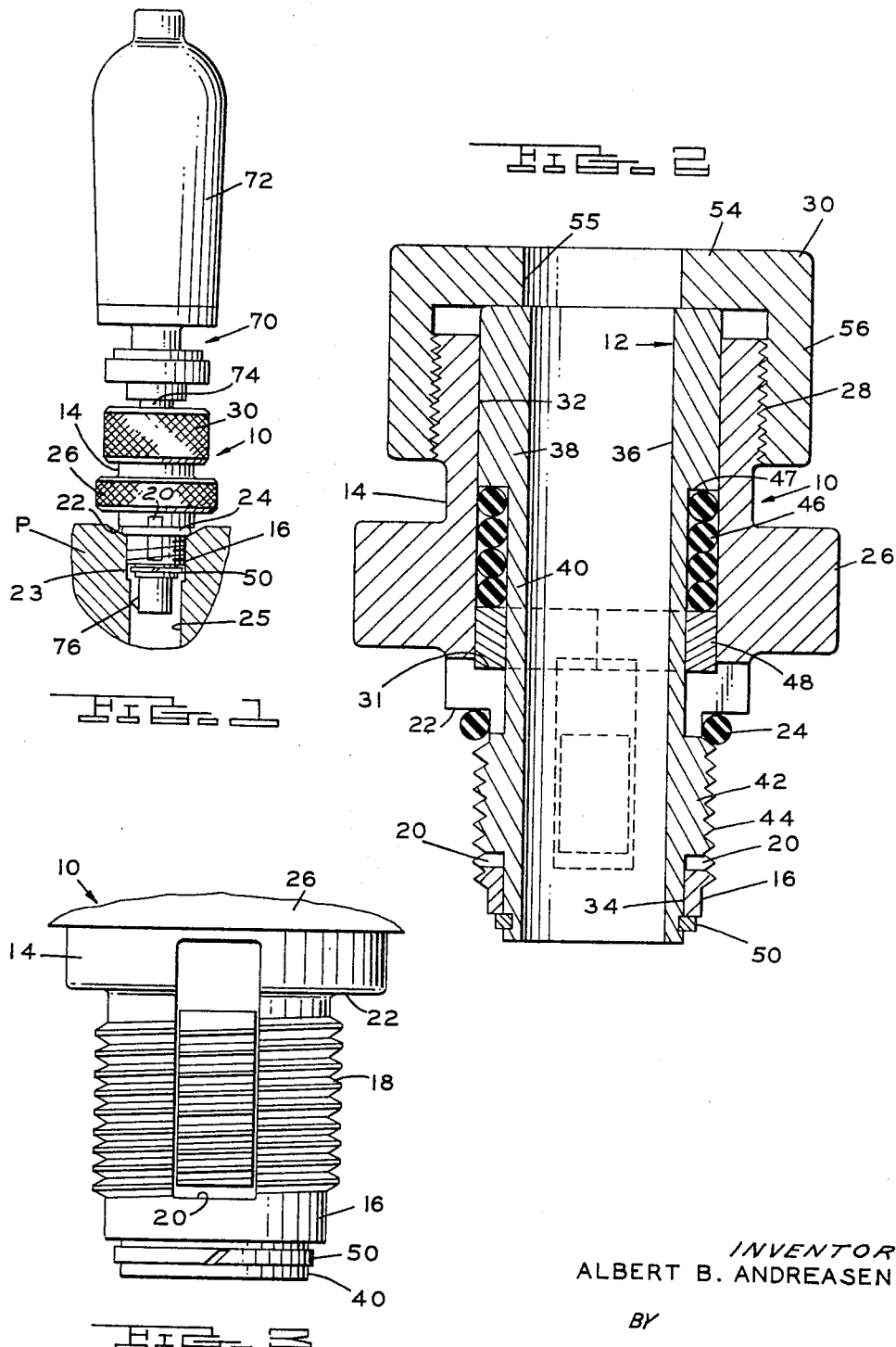

3,280,469
GAGE TO CHECK RELATIONSHIP OR CONCENTRICITY OF RELATED SURFACES TO THE PITCH DIAMETER OF A THREADED SURFACE
Albert B. Andreasen, Royal Oak, Mich., assignor to A. G. Davis Gage & Engineering Co., Hazel Park, Mich., a corporation of Michigan
Filed Apr. 29, 1964, Ser. No. 360,857
12 Claims. (Cl. 33—199)

This invention relates generally to gage type instruments and refers more particularly to a device for establishing the pitch centerline of a threaded hole.

It is an essential object of this invention to provide a device for more accurately establishing the true pitch centerline of a threaded hole.

Another object of the invention is to provide a device of the above type which may be used to check the relationship or concentricity of related surfaces to the pitch centerline or pitch diameter of a threaded hole.

Another object is to provide a device for accurately establishing the true pitch centerline of a threaded hole which comprises a body having a threaded portion, an axially movable member carried by the body and having a threaded segment disposed in an interruption of the threads in the threaded portion of the body, and means for axially moving the member relative to the body to cause the threads of the segment to clamp the threads of a hole into which the device is threaded.

Another object is to provide a device as described above in which the body is tubular and has a threaded end portion provided with circumferentially spaced apertures, and the axially movable member is slidably fitted in the body and has threaded segments projecting through the apertures which are normally aligned with the threads of the body portion but which may be moved out of alignment therewith to clamp the threads of a hole into which the device is threaded.

Another object is to provide a novel means for normally aligning the threads of the segments with the threads of the body portion comprising resilient means, preferably in the form of O-rings, interposed between the body and the elongated member for moving the member in one direction relative to the body, and stops for limiting the movement of the member relative to the body so that the threads on the body portion and on the segments are aligned.

Another object is to provide a novel construction in which the axially movable member carrying the segments may be assembled into the tubular body quickly and easily.

Another object is to provide a device as described above in which the elongated member which carries the segments is in the form of a barrel, its inner surface being cylindrical and serving as a support for a gage or other device adapted to determine the relationship of a related surface to the true pitch centerline of a threaded hole.

Another object is to provide a novel means for moving the elongated member or barrel axially within the tubular member to move the threads of the segments out of alignment with the threads of the body, comprising a cap threaded on the body across the outer end thereof and engageable with the projecting outer end portion of the barrel.

Other objects and features of the invention will become more apparent as the description proceeds, especially when taken in conjunction with the accompanying drawings, wherein:

FIGURE 1 is a side elevation view, with parts in section, showing the device of my invention threaded into a hole and having a gage associated therewith for determining the relationship between the pitch diameter or centerline of the thread and the diameter of the bore in which the threads are formed.

FIGURE 2 is an enlarged longitudinal sectional view of the device of my invention, showing the barrel in its normal position within the body in which the threads of the barrel segments are aligned with the threads on the body.

FIGURE 3 is a fragmentary elevational view of the lower end portion of the device shown in FIGURE 2, in which the threaded segments have been moved axially so that the threads thereof are out of alignment with the threads on the body.

Referring now more particularly to the drawing, the device of my invention is shown in axial section in FIGURE 2 and includes a body 10 and a barrel 12 axially slidably fitted within the body. The body 10 is an elongated tubular member having a main body portion 14 and a threaded inner end portion 16. The threaded inner end portion 16 can best be seen in FIGURE 3 in which the continuous thread thereof on the external surface is designated 18. The threaded inner end portion 16 is formed with a plurality of circumferentially spaced axially extending rectangular apertures 20. In the present instance, there are four equally spaced apertures, although it will be understood that the number of apertures may vary. Preferably there will be three or more such apertures.

There is an annular inwardly facing shoulder 22 at the junction between the main portion 14 and the threaded inner end portion 16 of the body. Preferably a resilient compressible O-ring 24 surrounds the inner end portion 16 of the body and is seated against the shoulder 22. This O-ring 24 may be omitted although preferably it is employed to prevent the shoulder 22 from being clamped solid against the surface of a part having the hole in which the device is threaded. FIGURE 1 shows the device threaded into the threaded portion 23 of a cylindrical bore 25 of a part P. The ring 24 will be seen between the shoulder 22 and the chamfered surface of the part around the hole.

The main portion 14 of the body has an enlarged annular knurled portion 26 which serves as a handgrip in the use of the device. The outer end portion of the main portion 14 of the body is exteriorly threaded as indicated at 28 to receive a threaded cap 30 about which more will be said hereinafter.

The body 10 will be seen to have an annular internal shoulder 31 which faces in an outward direction. Extending between the shoulder 31 and the outer end of the body is a cylindrical internal surface 32. A cylindrical internal surface 34 extends from the shoulder 31 to the inner end thereof. The diameter of the cylindrical surface 32 is larger than the diameter of the cylindrical surface 34. The surfaces are, however, coaxial.

Referring to FIGURES 2 and 3, it will be noted that the apertures 20 in the threaded inner end portion of the body extend beyond the shoulder 22 and into the main portion 14 of the body 10. In other words, these apertures cut across the shoulder 22. The purpose of this is to facilitate assembly of the barrel 12, as will appear more fully hereinafter.

The barrel 12 is an elongated tubular member having a continuous cylindrical interior surface 36. The barrel has an enlarged outer end portion 38, and the main body portion 40 thereof extends from the enlarged outer end to the inner end of the barrel. The external surface of the main portion 40 of the barrel is cylindrical and has a close sliding fit in the cylindrical surface 34 of the body. The external surface of the enlarged portion 38 is cylindrical and has a close sliding fit in the interior cylindrical surface 32 of the body.

The main portion 40 of the barrel has near its inner end a plurality of integral radially outwardly projecting segments 42 which are threaded as shown at 44. While preferably integral, segments 42 could be separately formed and permanently secured to the barrel. These segments 42 project outward through the apertures 20. The number of segments corresponds to the number of apertures 20. Normally the threads of the segments 42 are aligned with the threads 18 on the body. This is accomplished by means including the plurality of resilient compressible O-rings 46 which encircle the main portion 40 of the barrel and are disposed between the shoulder 47 on the barrel and the split collar 48. The shoulder 47 is an external shoulder formed at the junction between the main portion 40 of the barrel and the enlarged outer end portion 38 thereof. The collar 48 is disposed within the enlarged cylindrical interior surface 32 of the body and is seated against the interior annular shoulder 31. The O-rings are compressed between the shoulder 47 of the barrel and the collar 48, and urge the barrel in an outward direction, or upward in FIGURE 2, relative to the body. The barrel has a snap ring 50 positioned in an annular groove near its inner end which forms a stop engageable with the inner end of the body. The snap ring 50 is located in a position such that when it contacts the inner end of the body 16 the threads of the segments 42 are aligned with the threads 18 of the body. Normally, the barrel will be held in the position illustrated in FIGURE 2 in which the threads are aligned, by the action of the O-rings 46.

The collar 48 is provided to cover the apertures 20 and thereby prevent the O-rings 46 from being extruded through the apertures.

In order to advance the barrel 12 in an inward direction relative to the body to move the segment threads out of alignment with the body threads, the cap 30 is provided. The cap 30 is cup-shaped, having a base 54 formed with the central opening 55, and an externally knurled annular rim 56 which is internally threaded and is threaded on the outer end of the body. Rotation of the cap 30 in one direction will cause the barrel 12 to be advanced inwardly by reason of the engagement of the base 54 of the cap with the projecting outer end of the barrel. FIGURE 3 illustrates the relationship between the threads when the barrel has been thus advanced axially in an inward direction relative to the body.

It will be noted that the maximum diameter of the segments, measured at the crests of their threads, is slightly less than the diameter of the enlarged interior surface 32 of the body. Since the apertures 20 are extended past the shoulder 22 and into the main portion of the body, it will be apparent that the barrel 12 may be assembled into the body by being inserted into the outer end thereof and advanced in an inward direction into full assembled relationship as shown in FIGURE 2. This, of course, will be done before the cap 30 is applied.

In use, the cap 30 is backed off sufficiently to permit the barrel to assume its normal position within the body, in which the stop 50 engages the inner end of the body and locates the segments so that the threads thereof are aligned with the body threads. The device is then threaded into the threaded portion 23 of the bore 25 in part P. The O-ring 24 prevents shoulder 22 from clamping solid against part P. Thereupon the cap 30 is rotated to advance the barrel in an inward direction causing the threads of the segments to move out of alignment with the body threads and to clamp against the threads of the threaded hole. The device is thereby oriented so that the longitudinal centerline of the barrel coincides with the true pitch centerline of the threaded hole.

The device may be used to determine the relationship between the threaded hole 23 and some other related surface. As shown in FIGURE 1, the device is shown with a gage 70 inserted into the barrel. The gage 70 has an elongated cylindrical shaft 74 which has a close rotatable fit in the interior surface 36 of the barrel. Hence the longitudinal centerline of the shaft 74 will coincide with that of the barrel. The opening 55 in the cap clears shaft 74. Shaft 74 is provided at its lower or inner end with a radially movable follower 76 for engaging the bore 25. The shaft 74 can be rotated and the radially in and out movement of the follower 76 will indicate the relationship of bore 25 to the pitch centerline of the threaded hole 23. The movement of follower 76 can be determined by an indicator, not shown, in the upper portion 72 of the gage.

What I claim as my invention is:

1. A device for accurately establishing the true pitch centerline of a threaded hole, comprising a tubular body having a threaded inner end portion, circumferentially spaced apertures in said threaded inner end portion, said body having an internal annular shoulder between its ends facing toward the outer end of said body, said body having a cylindrical interior surface extending from said shoulder to its outer end and having a second cylindrical interior surface of smaller diameter than said first-mentioned cylindrical surface extending from said shoulder to its inner end, an elongated member having a main portion slidably fitted in said second cylindrical surface of said body and having an enlarged outer end portion slidably fitted in said first-mentioned cylindrical surface, said main portion of said member having threaded segments projecting through said apertures, means normally axially positioning said member so that the threads of said segments align with the threads of the inner end portion of said body including resilient means interposed between said enlarged outer end portion of said member and said shoulder of said body urging said member outwardly relative to said body, stops on said body and said member limiting axially outward movement of said member relative to said body, and means for axially moving said member axially inwardly relative to said body against the action of said resilient means to cause the threads of said segments to clamp the threads of a hole into which said device is threaded.

2. The device defined in claim 1, wherein said resilient means includes a plurality of resilient O-rings encircling the main portion of said member.

3. The device defined in claim 1, wherein the enlarged outer end portion of said member projects outwardly beyond the outer end of said body, and said member moving means comprises a cap threaded on said body across the outer end thereof engageable with the projecting outer end portion of said member.

4. The device defined in claim 1, wherein said threaded segments are smaller in diameter than the first-mentioned cylindrical interior surface of said body, and said apertures extend axially outwardly through said shoulder so that said member can be assembled in said body through the outer end of the latter.

5. The device defined in claim 4, wherein said resilient means includes a plurality of resilient O-rings encircling the main portion of said member between the outer end portion of said member and said shoulder of said body, and a collar encircling said main portion of said member between said O-rings and said shoulder to prevent said O-rings from being extruded through said apertures.

6. A device for accurately establishing the true pitch centerline of a threaded hole, comprising a tubular body having a threaded inner end portion, circumferentially spaced apertures in said threaded inner end portion, said body having an internal annular shoulder between its ends facing toward the outer end of said body, said body having a cylindrical interior surface extending from said shoulder to its outer end and having a second cylindrical interior surface of smaller diameter than said first-mentioned cylindrical surface extending from said shoulder to its inner end, an elongated member having a main portion slidably fitted in said second cylindrical surface of said body and having an enlarged outer end portion slidably fitted in said first-mentioned cylindrical surface, said main portion of said member having threaded segments projecting through said apertures, said segments being smaller in diameter than the first-mentioned cylindrical interior surface of said body, said apertures extending axially outwardly through said shoulder so that said member can be asesmbled in said body through the outer end of the latter, means normally axially positioning said member so that the threads of said segments align with the threads of the inner end portion of said body including a plurality of resilient O-rings encircling the main portion of said member between the outer end portion of said member and said shoulder of said body urging said member outwardly relative to said body, a collar encircling said main portion of said member between said O-rings and said shoulder to prevent said O-rings from being extruded through said apertures, stops on said body and on the main portion of said member limiting axially outward movement of said member relative to said body, the enlarged outer end portion of said member projecting outwardly beyond the outer end of said body, and a cap threaded on said body across the outer end thereof engageable with the projecting outer end portion of said member to move said member axially inwardly relative to said body against the action of said O-rings to cause the threads of said segments to clamp the threads of a hole into which said device is threaded.

7. The device defined in claim 6, wherein said body has an external annular shoulder outwardly of the threaded end portion thereof facing inwardly, and an O-ring seated against said external shoulder to prevent said external shoulder from contacting the surface of a part having the hole into which said device is threaded.

8. The device defined in claim 6, wherein said elongated member is tubular and the interior thereof is cylindrical to support a gage for inspecting a related surface to the hole into which said device is threaded.

9. A device for accurately establishing the true pitch centerline of a threaded hole, comprising a tubular body having a main body portion, an inner end portion of reduced diameter provided with exterior threads, an annular inwardly facing external shoulder at the junction between said main body portion and said threaded inner end portion, an outwardly facing annular internal shoulder adjacent said external shoulder, a cylindrical internal surface extending from said internal shoulder to the outer end of said main body portion, a second cylindrical internal surface extending from said internal shoulder to the inner end of said exteriorly threaded inner end portion, and circumferentially spaced elongated apertures extending axially of said threaded inner end portion, through said external shoulder and into said main body portion, an elongated member within said tubular body having an enlarged outer end portion provided with a close sliding fit with the first mentioned cylindrical internal surface of said main body portion, having adjacent its inner end a plurality of radially outwardly projecting elongated segments extending through said elongated apertures and having exterior threads, and having at opposite ends of said segments two aligned cylindrical exterior surfaces, one being provided with a close sliding fit with said second cylindrical internal surface, means normally aligning the threads of the segments with the threads of the inner end portion of reduced diameter including means on the elongated member forming a stop for the inner end portion of reduced diameter, and means for moving the elongated member in an inward direction relative to the tubular body to move the threads of the segments out of alignment with the threads of the inner end portion of reduced diameter to clamp the threads of a threaded hole into which said device is threaded.

10. The device defined in claim 9, wherein the first mentioned means comprises a split collar encircling the second of the aligned cylindrical exterior surfaces of said elongated member and engaging said outwardly facing annular internal shoulder, and a plurality of resilient compressible O-rings encircling said second of the aligned cylindrical exterior surfaces and disposed between said split collar and a shoulder on said elongated member at one end of said second of the aligned cylindrical exterior surfaces.

11. The device defined in claim 9, wherein the third mentioned means comprises a rotatable cap threadedly engaging said main body portion and operable to advance the elongated member in an inward direction to cause the threads on said elongated segments to move out of alignment with the threads on said inner end portion of reduced diameter and to clamp the threads of a threaded hole into which said device is threaded.

12. A device for accurately establishing the true pitch centerline of a threaded hole, comprising a tubular body having a threaded portion provided with circumferentially spaced apertures, an elongated member axially slidably fitted in said body and having threaded segments projecting through said apertures the threads of which are normally aligned with the threads of said body portion, and means for axially moving said member in one direction relative to said body to cause the threads of said segments to clamp the threads of a hole into which said device is threaded, said elongated member being tubular and having a cylindrical inner surface to rotatably support a gage for inspecting a surface related to the hole into which the device is threaded.

References Cited by the Examiner
UNITED STATES PATENTS

| | | | |
|---|---|---|---|
| 2,400,293 | 5/1946 | Dunn | 33—174 X |
| 2,766,532 | 10/1956 | Eisele | 33—174 |
| 2,782,521 | 2/1957 | Parker et al. | 33—199 |

LEONARD FORMAN, *Primary Examiner.*

HARRY N. HAROIAN, *Assistant Examiner.*